(12) United States Patent
Smith

(10) Patent No.: US 11,231,010 B2
(45) Date of Patent: Jan. 25, 2022

(54) MODULAR WIND TURBINE BLADE

(71) Applicant: Vestas Wind Systems A/S, Aarhus N. (DK)

(72) Inventor: Jonathan Smith, Burridge (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/059,688

(22) PCT Filed: May 31, 2019

(86) PCT No.: PCT/DK2019/050172
§ 371 (c)(1),
(2) Date: Nov. 30, 2020

(87) PCT Pub. No.: WO2019/228600
PCT Pub. Date: Dec. 5, 2019

(65) Prior Publication Data
US 2021/0215133 A1   Jul. 15, 2021

(30) Foreign Application Priority Data
Jun. 1, 2018   (DK) .......................... PA 2018 70319

(51) Int. Cl.
*F03D 1/06*   (2006.01)
(52) U.S. Cl.
CPC ...... *F03D 1/0675* (2013.01); *F05B 2240/302* (2013.01)
(58) Field of Classification Search
CPC .... F03D 1/0633; F03D 1/0675; F03D 1/0683; F05B 2240/302
See application file for complete search history.

(56) References Cited

U.S. PATENT DOCUMENTS 8,382,440 B2 *   2/2013   Baker .................. B29C 70/304
                                             416/226
9,506,452 B2 *   11/2016   Bakhuis ................ F03D 80/50
(Continued)

FOREIGN PATENT DOCUMENTS

EP   2740583 A1   6/2014
EP   2843227 A1   3/2015
(Continued)

OTHER PUBLICATIONS

Danish Patent and Trademark Office, Search and Examination Report in PA 2018 70319, dated Nov. 6, 2018.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

A modular wind turbine blade is described. The modular blade comprises a first blade 5 module having a first spar cap extending longitudinally in a spanwise direction and a second blade module having a second spar cap extending longitudinally in the spanwise direction. The blade modules are configured for connection end-to-end via their respective spar caps. The first spar cap comprises first and second beams arranged side-by-side, each beam having a tapered end defining a scarfed surface. The tapered end of the first 10 beam extends beyond the tapered end of the second beam. The second spar cap comprises first and second beams arranged side-by-side, each beam having a tapered end defining a scarfed surface. The tapered end of the second beam extends beyond the tapered end of the first beam. The blade modules are configured such that when the modules are connected together the scarfed surfaces of the respective first beams mate 15 to form a first scarf joint and the scarfed (Continued)

surfaces of the respective second beams mate to form a second scarf joint. The first scarf joint is offset from the second scarf joint in the spanwise direction.

11 Claims, 7 Drawing Sheets

(56) References Cited

U.S. PATENT DOCUMENTS

| | | | |
|---|---|---|---|
| 9,951,751 B2 * | 4/2018 | Yarbrough | F03D 13/10 |
| 10,544,776 B2 * | 1/2020 | Danielsen | F03D 1/0675 |
| 2011/0142667 A1 | 6/2011 | Miebach et al. | |
| 2012/0141286 A1 | 6/2012 | Kyriakides et al. | |
| 2020/0408189 A1 * | 12/2020 | Pal | F03D 1/0683 |
| 2021/0086463 A1 * | 3/2021 | Barton | B29C 65/78 |

FOREIGN PATENT DOCUMENTS

| | | |
|---|---|---|
| WO | 2012004571 A2 | 1/2012 |
| WO | 2015051803 A1 | 4/2015 |
| WO | 2016198075 A1 | 12/2016 |

OTHER PUBLICATIONS

European Patent Office, International Search Report and Written Opinion in PCT Application No. PCT/DK2019/050172, dated Aug. 28, 2019.

* cited by examiner

MODULAR WIND TURBINE BLADE

TECHNICAL FIELD

The present invention relates generally to modular wind turbine blades, and more specifically to a modular wind turbine blade having an improved joint between blade modules.

BACKGROUND

There is a continuing desire to generate increased levels of power from wind power production facilities such as on-shore and off-shore wind farms. One way to achieve this is to manufacture modern wind turbines with larger blades. The provision of larger blades increases the swept area of the rotor, allowing the wind turbine to capture more energy from the wind.

Transportation of large components, in particular long rotor blades, can be problematic as a wind farm site may be remote and difficult to access. To resolve this problem, the rotor blades may be designed as a modular assembly. A turbine blade may be divided into two or more modules that are easier to transport and which are then assembled on site by adhesively bonding the modules together. It is advantageous for the two or more blade modules to be provided at the wind farm site as two or more finished components. In this manner the on-site assembly process is simplified and the assembly time is reduced.

Modern wind turbine blades generally include a reinforcing spar structure comprising spar caps and a shear web to provide structural support in conformance with the design specification of the blade. The spar caps may be formed of strips of composite material, typically carbon-fibre reinforced plastic (CFRP), embedded within the laminate structure of a blade module shell. The spar caps are arranged in mutually opposed relation on windward and leeward sides of the blade modules. The shear web is typically bonded between the opposed spar caps.

In a modular wind turbine blade, the reinforcing spar structure may be divided into a plurality of longitudinal sections each associated with a respective blade module. The spar sections are typically bonded together at the interface between blade modules. As the spar is the primary load-bearing component of the blade, it is important to ensure that the joint between adjacent spar sections is as strong as possible. The present invention therefore aims to provide an improved joint scheme between adjacent blade modules.

SUMMARY OF INVENTION

In a first aspect of the invention there is provided a modular wind turbine blade comprising a first blade module having a first spar cap extending longitudinally in a spanwise direction and a second blade module having a second spar cap extending longitudinally in the spanwise direction. The blade modules are configured for connection end-to-end via their respective spar caps. The first spar cap comprises first and second beams arranged side-by-side, each beam having a tapered end defining a scarfed surface. The tapered end of the first beam extends beyond the tapered end of the second beam. The second spar cap comprises first and second beams arranged side-by-side, each beam having a tapered end defining a scarfed surface. The tapered end of the second beam extends beyond the tapered end of the first beam. The blade modules are configured such that when the modules are connected together the scarfed surfaces of the respective first beams mate to form a first scarf joint and the scarfed surfaces of the respective second beams mate to form a second scarf joint. The first scarf joint is offset from the second scarf joint in the spanwise direction.

The tapered ends of the first and second beams of the first spar cap may be tapered in opposite directions to one another. The tapered ends of the first and second beams of the second spar cap may be tapered in opposite directions to one another.

The scarfed surface of the first beam of the first spar cap and the scarfed surface of the second beam of the second spar cap may each face one of an interior or an exterior of the blade. The scarfed surface of the second beam of the first spar cap and the scarfed surface of the first beam of the second spar cap may each face the other of the interior or the exterior of the blade.

The first blade module may comprise an outer shell defining an interior of the first blade module. The second blade module may comprise an outer shell defining an interior of the second blade module. The first scarf joint may be at least partially within an outer shell of the second blade module. The second scarf joint may be at least partially within an outer shell of the first blade module. In some embodiments, one or both scarf joints may be wholly within one or other of the blade modules. In other embodiments, one or other scarf joint may have a windward shell of one module on one side, and a leeward shell of the other module on the other side.

The first blade module may comprise first and second shear webs attached respectively to the first and second beams of the first spar cap. The second blade module may comprise first and second shear webs attached respectively to the first and second beams of the second spar cap. When the blade modules of the modular wind turbine blade are connected together, an end of the first shear web of the first blade module may be aligned with an end of the first shear web of the second blade module at a first shear web interface.

An end of the second shear web of the first blade module may be aligned with an end of the second shear web of the second blade module at a second shear web interface. The first shear web interface is preferably offset from the second shear web interface in the spanwise direction when the blade modules are connected together.

The first shear web interface may be located at an end of the first scarf joint. The second shear web interface may be located at an end of the second scarf joint. The first shear webs of the respective blade modules may be connected at the first shear web interface when the blade modules are connected together. The second shear webs of the respective blade modules may be connected at the second shear web interface when the blade modules are connected together.

The first shear web interface may be at least partially within an outer shell of the second blade module and the second shear web interface may be at least partially within an outer shell of the first blade module. In some embodiments, one or both shear web interfaces may be wholly within one or other of the blade modules. In other embodiments, one or other shear web interface may have a windward shell of one module on one side, and a leeward shell of the other module on the other side.

When the blade modules are connected together, the first scarf joint is located within a first spanwise region and the second scarf joint is located within a second spanwise region. The first shear web of the first blade module is preferably continuous across the second spanwise region.

The second shear web of the second blade module is preferably continuous across the first spanwise region.

BRIEF DESCRIPTION OF DRAWINGS

The present invention will now be described in further detail by way of non-limiting example only with reference to the following figures in which.

DETAILED DESCRIPTION

Figure 1:
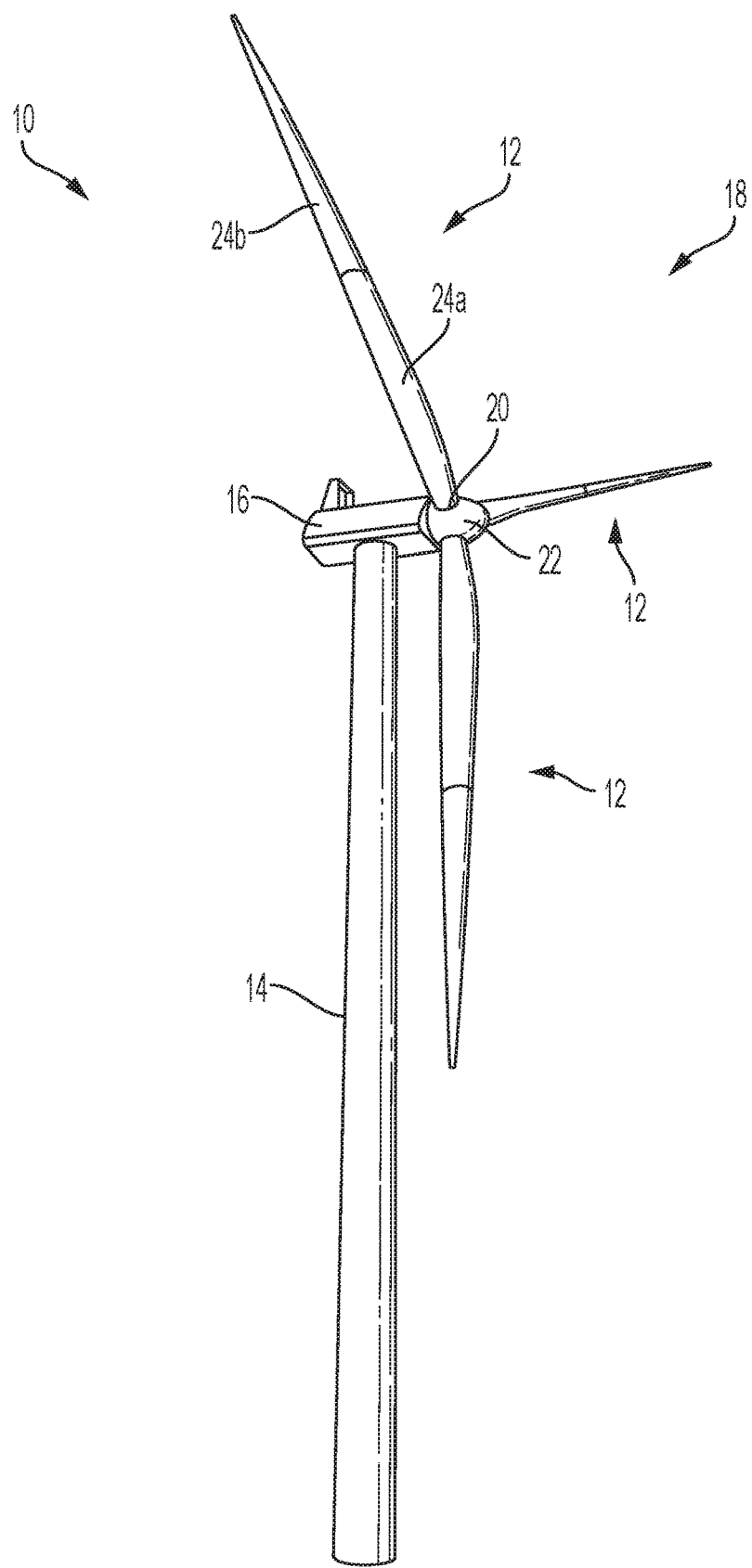
FIG. 1 is a schematic perspective view of a wind turbine comprising modular blades.

FIG. 1 is a schematic perspective view of a modern utility-scale wind turbine 10 comprising modular wind turbine blades 12 in accordance with an embodiment of the present invention. The wind turbine 10 comprises a tower 14 supporting a nacelle 16. A rotor 18 is mounted to the nacelle 16. The rotor 18 comprises a plurality of radially extending wind turbine blades 12 which are attached at their respective root ends 20 to a central hub 22. In this example, the rotor 18 comprises three blades 12, but in other embodiments the rotor 18 may have any number of blades 12. The wind turbine blades 12 in this example comprise first and second blade modules 24a, 24b, though more than two modules per blade 12 may be used in other embodiments. As explained by way of background, the modular blade 12 may be assembled at the wind farm site to facilitate easier transportation of large components.

Figure 2A:
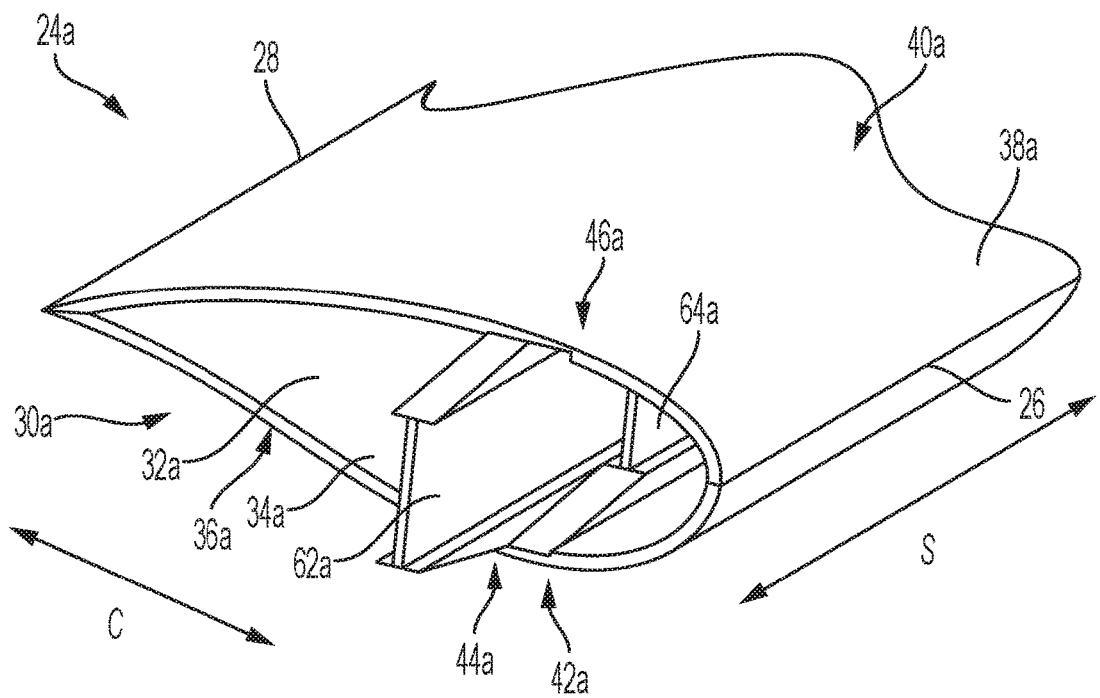
FIG. 2a is a schematic perspective view showing a portion of a first blade module of a modular blade.

FIG. 2a is a schematic perspective view of a portion of the first blade module 24a of the modular wind turbine blade 12. The first blade module 24a extends longitudinally in a spanwise direction (S) and transversely in a chordwise direction (C) between a leading edge 26 and a trailing edge 28. The first blade module 24a comprises an outer shell 30a defining a generally hollow interior 32a. In this example, the outer shell 30a is formed primarily from glass-fibre-reinforced plastic (GFRP). The outer shell 30a in this example is formed of two half shells: a first half shell 34a defining a first side 36a of the blade module 24a, and a second half shell 38a defining a second side 40a of the blade module 24a. In this example the first side 36a is a windward side of the blade module 24a and the second side 40a is a leeward side of the blade module 24a.

The first blade module 24a includes a longitudinally-extending spar structure 42a, which acts as a primary load-bearing structure of the blade 12. The spar structure 42a comprises first and second mutually opposed spar caps 44a, 46a arranged respectively on the windward side 36a and the leeward side 40a of the first blade module 24a. The spar structure 42a further comprises shear webs 62a, 64a, 70a, (shown in FIG. 3a) arranged between the opposed spar caps 44a, 46a.

Figure 2B:
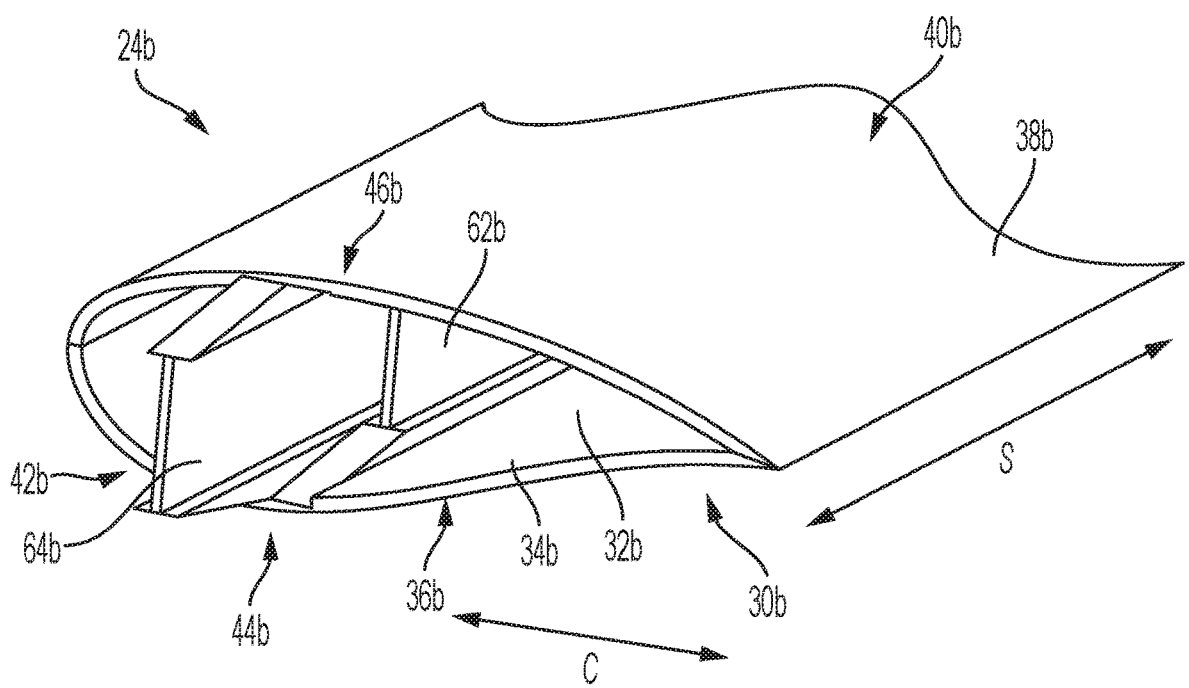
FIG. 2b is a schematic perspective view showing a portion of a second blade module of the modular blade.

FIG. 2b is a schematic perspective view of a portion of the second blade module 24b. The second blade module 24b is configured in a similar manner to the first blade module 24a and comprises an outer shell 30b defining a generally hollow interior 32b. The outer shell 30b is formed from a windward half shell 34b and a leeward half shell 38b bonded together. The second blade module 24b also includes a longitudinally-extending spar structure 42b. The spar structure 42b comprises first and second mutually opposed spar caps 46b, 44b arranged respectively on the leeward side 40b and windward side 36b of the second blade module 24b with shear webs 62b, 64b, 70b (shown in FIG. 3b) arranged between them.

Further constructional features of the blade modules 24a, 24b will now be described by way of example with reference to FIGS. 3a and 3b, which are schematic perspective views showing parts of the windward half shells 34a, 34b of the first and second blade modules 24a, 24b respectively. It will be appreciated that the leeward half shells 38a and 38b have features corresponding to the windward half shells 34a, 34b. In this embodiment, the leeward half shells 38a, 38b are effectively a mirror image of the windward half shells 34a, 34b.

Figure 3A:
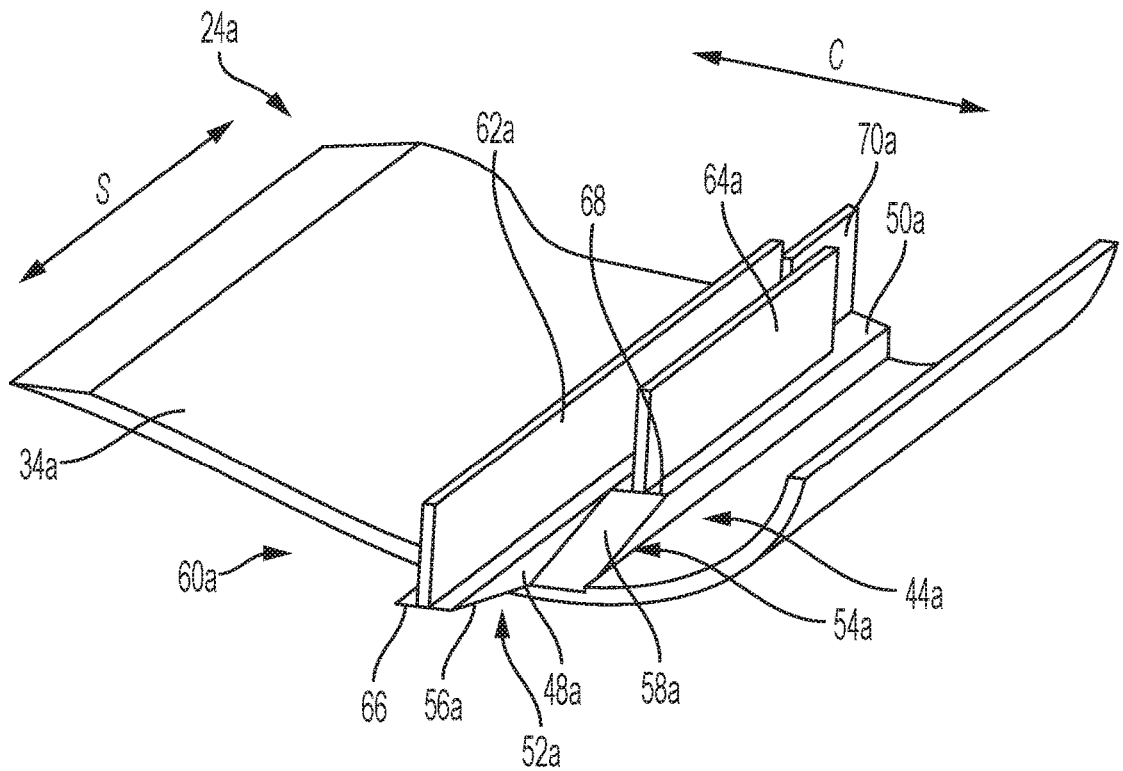
FIG. 3a is a schematic perspective view showing part of a windward half shell and parts of a spar structure of the first blade module.
Figure 3B:
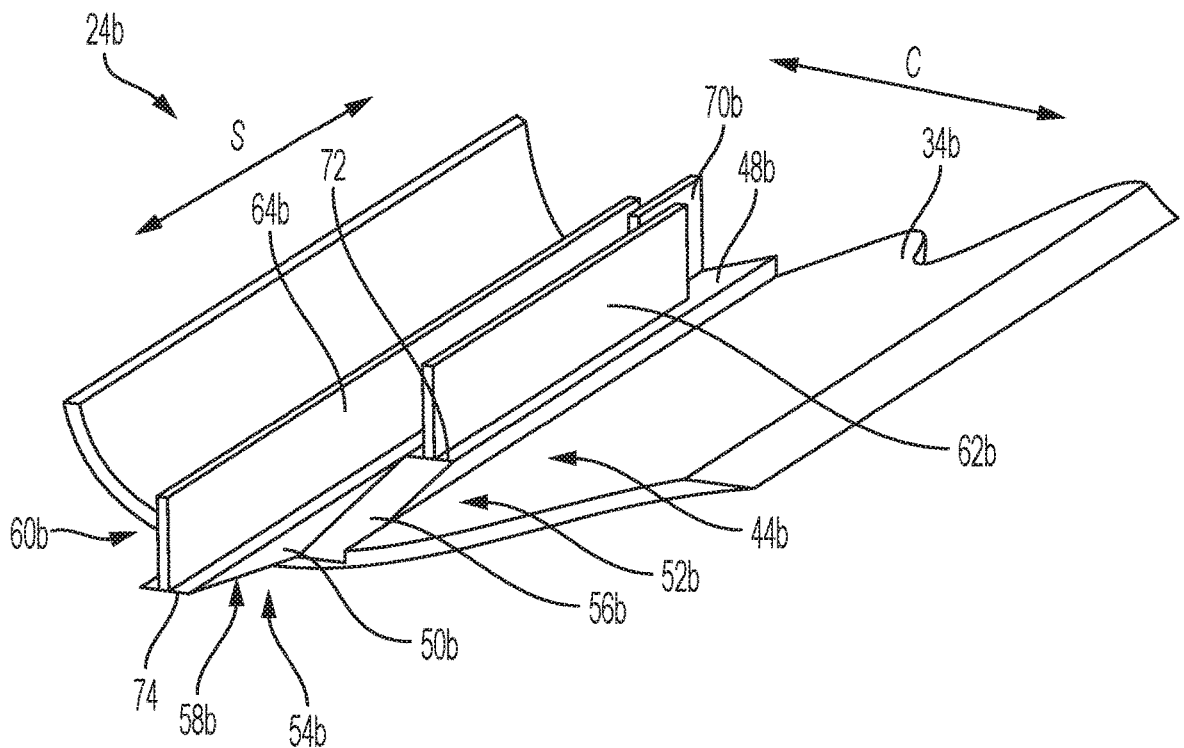
FIG. 3b is a schematic perspective view showing part of a windward half shell and parts of a spar structure of the second blade module.

Referring to FIGS. 3a and 3b, the spar caps 44a, 44b of the respective blade modules 24a, 24b each comprise at least two beams arranged side-by side. In the present embodiment, each spar cap comprises a first beam 48a, 48b and a second beam 50a, 50b arranged side-by-side. The beams 48a, 48b, 50a, 50b are preferably formed from one or more strips of reinforcing material, for example carbon fibre reinforced plastic (CFRP). In preferred embodiments, each beam 48a, 48b, 50a, 50b is formed from a stack of such strips. The strips are preferably formed by pultrusion. In this embodiment, the spar caps 44a, 44b are embedded within the shell structure of the blade modules 24a, 24b. In other examples, the spar caps 44a, 44b may be bonded to an inner surface of the shell 30a, 30b.

As shown in FIG. 3a, each of the first and second beams 48a, 50a of the first spar cap 44a of the first blade module 24a has a tapered end 52a, 54a defining a scarfed surface 56a, 58a. The tapered end 52a of the first beam 48a extends beyond the tapered end 54a of the second beam 50a in the spanwise direction (S). The tapered ends 52a, 54a of the first and second beams 48a, 50a are tapered in opposite directions to one another. In this embodiment, the scarfed surface 56a of the first beam 48a faces an exterior of the blade 12, whilst the scarfed surface 58a of the second beam 50a faces an interior of the blade 12.

As shown in FIG. 3b, each of the first and second beams 48b, 50b of the second spar cap 44b of the second blade module 24b has a tapered end 52b, 54b defining a scarfed surface 56b, 58b. The tapered end 54b of the second beam 50b extends beyond the tapered end 52b of the first beam 48b in the spanwise direction (S). The tapered ends 52b, 54b of the first and second beams 48b, 50b are tapered in opposite directions to one another. In this embodiment, the scarfed surface 56b of the first beam 48b faces an interior of the blade 12, whilst the scarfed surface 58b of the second beam 50b faces an exterior of the blade 12.

Referring again to FIG. 3a, the first blade module 24a comprises a plurality of shear webs 62a, 64a, 70a. At a joint end 60a of the first blade module 24a, a first shear web 62a is attached to the first beam 48a and a second shear web 64a is attached to the second beam 50a. In this example, the first shear web 62a terminates at the end 66 of the first beam 48a, whilst the second shear web 64a terminates at the beginning 68 of the scarfed surface 58a of the second beam 50a. Accordingly, the first shear web 62a is longer than the second shear web 64a and extends beyond the second shear web 64a in the spanwise direction (S). In a remainder of the first blade module 24a, i.e. away from the joint end 60a, a single shear web 70a is attached to the first spar cap 44a. The plurality of shear webs 62a, 64a, 70a are connected between the opposed spar caps 44a, 46a of the windward and leeward shells 34a, 38a (as shown in FIG. 2a).

As shown in FIG. 3b, the second blade module 24b also comprises a plurality of shear webs 62b, 64b, 70b arranged in a similar manner to the shear webs 62a, 64a, 70a of the first blade module 24a. In particular, at a joint end 60b of the second blade module 24b, a first shear web 62b is attached to the first beam 48b and a second shear web 64b is attached to the second beam 50b. In this example, the first shear web 62b terminates at the beginning 72 of the scarfed surface 56b of the first beam 48b, whilst the second shear web 64b terminates at the end 74 of the second beam 50b. Accordingly, the second shear web 64b is longer than the first shear web 62b and extends beyond the first shear web 62b in the spanwise direction (S). In a remainder of the second blade module 24b, i.e. away from the joint end 60b, a single shear web 70b is attached to the second spar cap 44b. The plurality of shear webs 62b, 64b, 70b are connected between the opposed spar caps 46b, 44b of the leeward and windward shells 38b, 34b as shown in FIG. 2b.

The provision of multiple shear webs at the joint ends 60a, 60b of the blade modules 24a, 24b ensures a continuous shear load path across the joint between blade modules 24a, 24b as will be described in further detail later.

Figure 4:
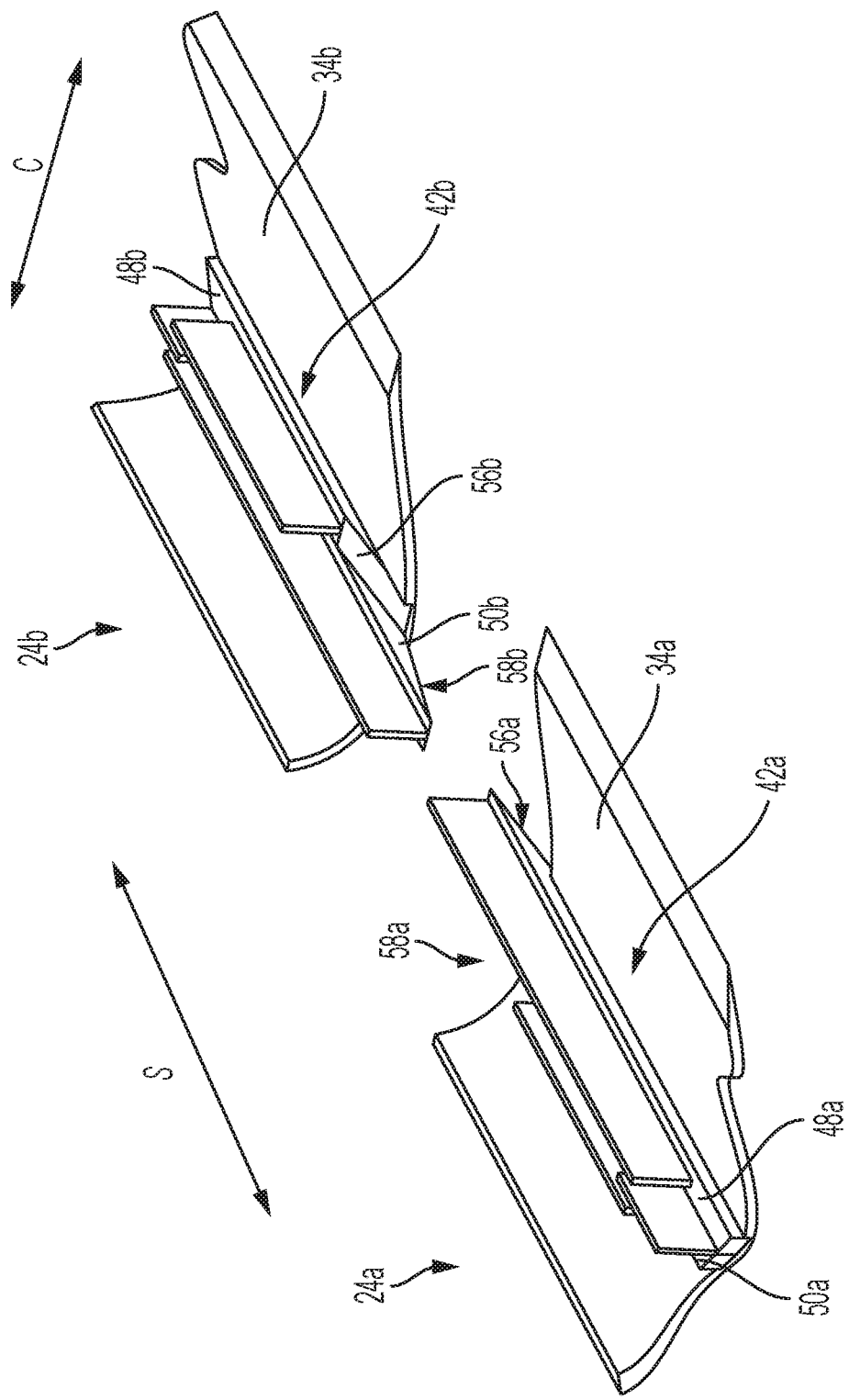
FIG. 4 shows the windward half shells of the first and second blade modules aligned before being connected together.
Figure 5:
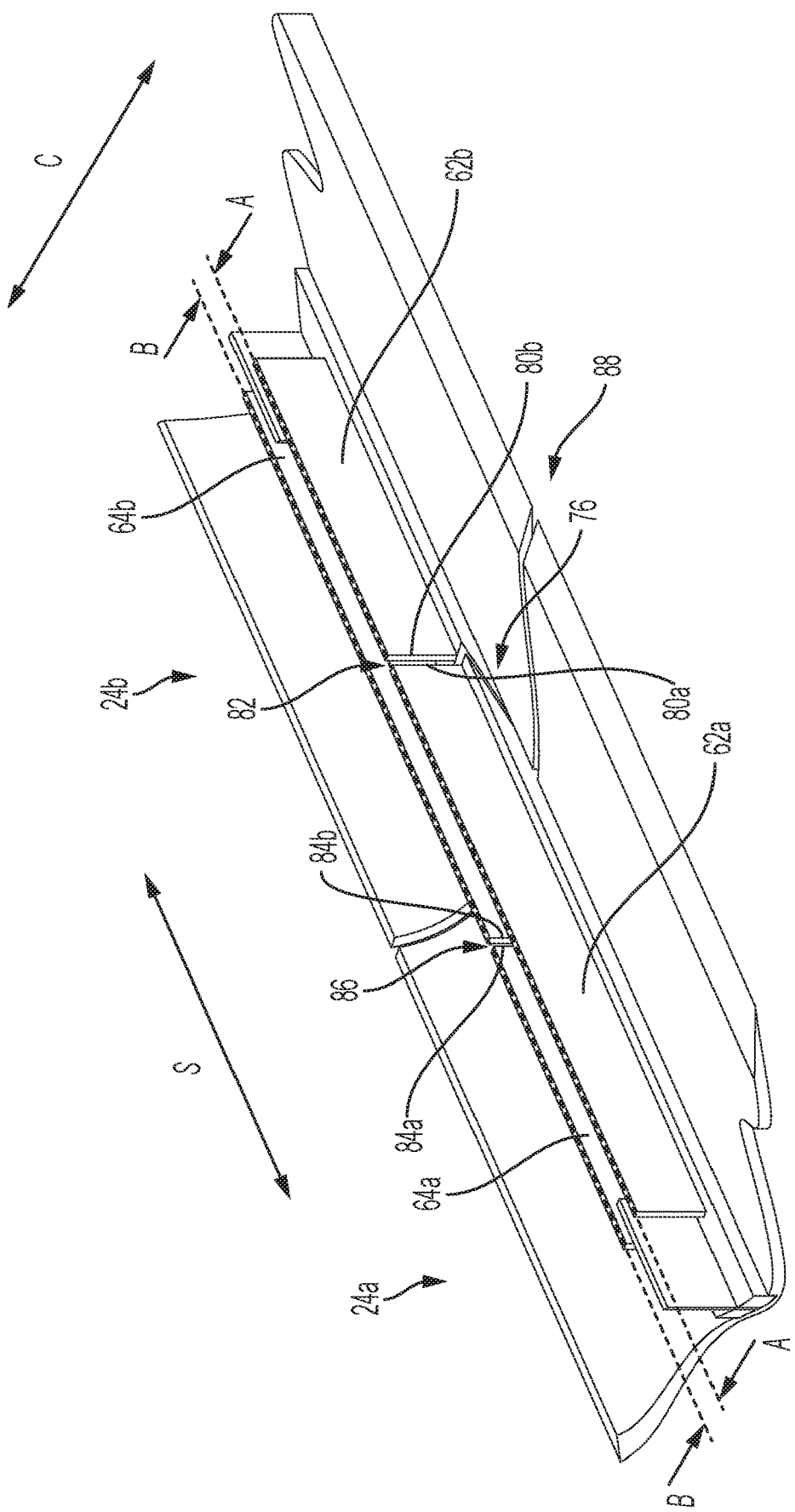
FIG. 5 shows the windward half shells of the first and second blade modules connected together.

The method of connecting the blade modules 24a, 24b together will now be briefly described with reference to FIGS. 4 and 5. FIG. 4 schematically shows the first and second blade modules 24a, 24b being aligned co-linearly before being connecting together, whilst FIG. 5 shows the modules 24a, 24b connected together. For the avoidance of doubt, the leeward half shells 38a, 38b are omitted in FIGS. 4 and 5 so that the spar components can be seen. In practice, the windward and leeward half shells 34a, 34b and 38a, 38b are typically bonded together (as shown in FIGS. 2a and 2b) before the modules 24a, 24b are connected together.

Referring to FIG. 4, the first and second blade modules 24a, 24b are configured for connection end-to end primarily via their respective spar structures 42a, 42b. In particular, the scarfed surfaces 56a, 58a of the beams 48a, 50a of the first blade module 24a are configured to connect to the scarfed surfaces 56b, 58b of the beams 48b, 50b of the second blade module 24b. More precisely, in this example, the scarfed surface 56a of the first beam 48a of the first blade module 24a is arranged to mate with the scarfed surface 56b of the first beam 48b of the second blade module 24b when the blade modules 24a, 24b are joined together. The scarfed surfaces 56a, 56b of the respective first beams 48a, 48b form a first scarf joint 76 (shown in FIGS. 5 and 6a) when connected together. Similarly, the scarfed surface 58a of the second beam 50a of the first blade module 24a is arranged to mate with the corresponding scarfed surface 58b of the second beam 50b of the second blade module 24b. The scarfed surfaces 58a, 58b of the respective second beams 50a, 50b form a second scarf joint 78 (shown in FIG. 6b) when the blade modules 24a, 24b are connected. In this embodiment, the scarf joints 76, 78 are formed by adhesively bonding the mating scarfed surfaces 56a, 56b and 58a, 58b together.

Referring to FIG. 5, when the blade modules 24a, 24b are connected, an end 80a of the first shear web 62a of the first blade module 24a is aligned with an end 80b of the first shear web 62b of the second blade module 24b. A first shear web interface 82 is defined between the adjacent ends 80a, 80b of the respective first shear webs 62a, 62b. Similarly, an end 84a of the second shear web 64a of the first blade module 24a is aligned with an end 84b of the second shear web 64b of the second blade module 24b. A second shear web interface 86 is defined between the adjacent ends 84a, 84b of the respective second shear webs 64a, 64b.

The first shear webs 62a, 62b of the respective blade modules 24a, 24b are preferably connected at the first shear web interface 82. The second shear webs 64a, 64b of the respective blade modules 24a, 24b are preferably connected at the second shear web interface 86 when the blade modules 24a, 24b are connected together. In this embodiment, the aligned ends 80a, 80b and 84a, 84b of the respective shear webs 62a, 62b and 64a, 64b are bonded together. In other embodiments the shear webs 62a, 62b, 64a, 64b may alternatively or additionally be connected by any other suitable means, such as over-laminating, or by mechanical fasteners, such as bolts.

Figure 6A:
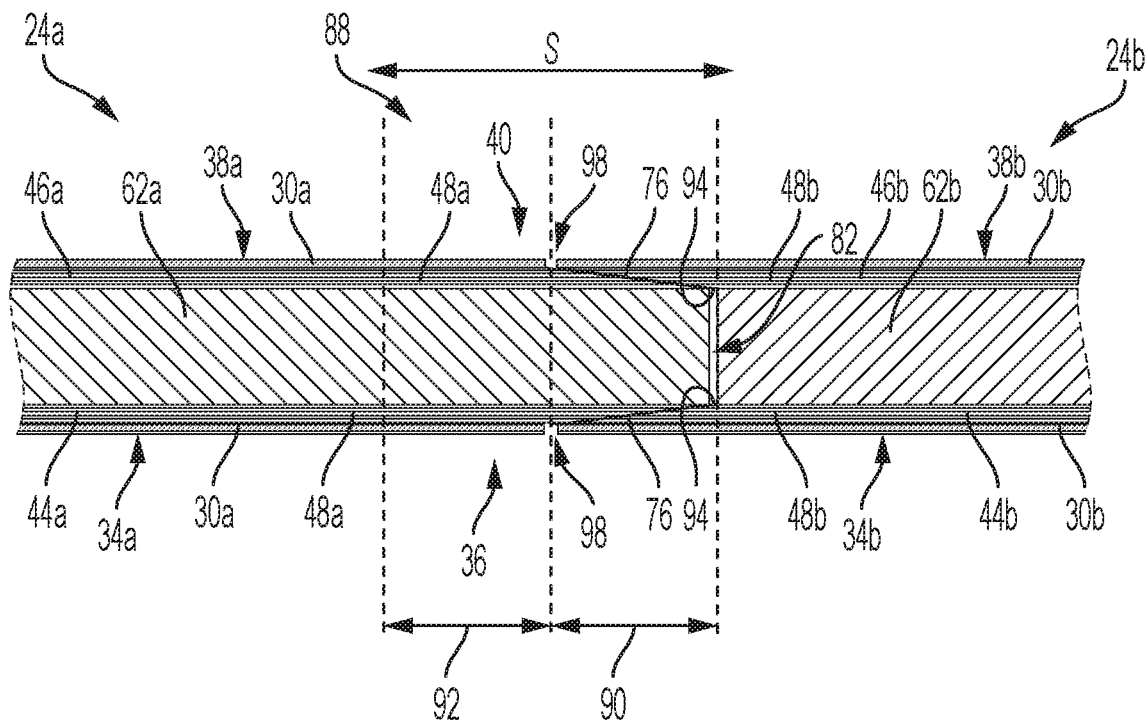
FIGS. 6a and 6b are schematic spanwise cross sectional views through a joint region of the modular blade.
Figure 6B:
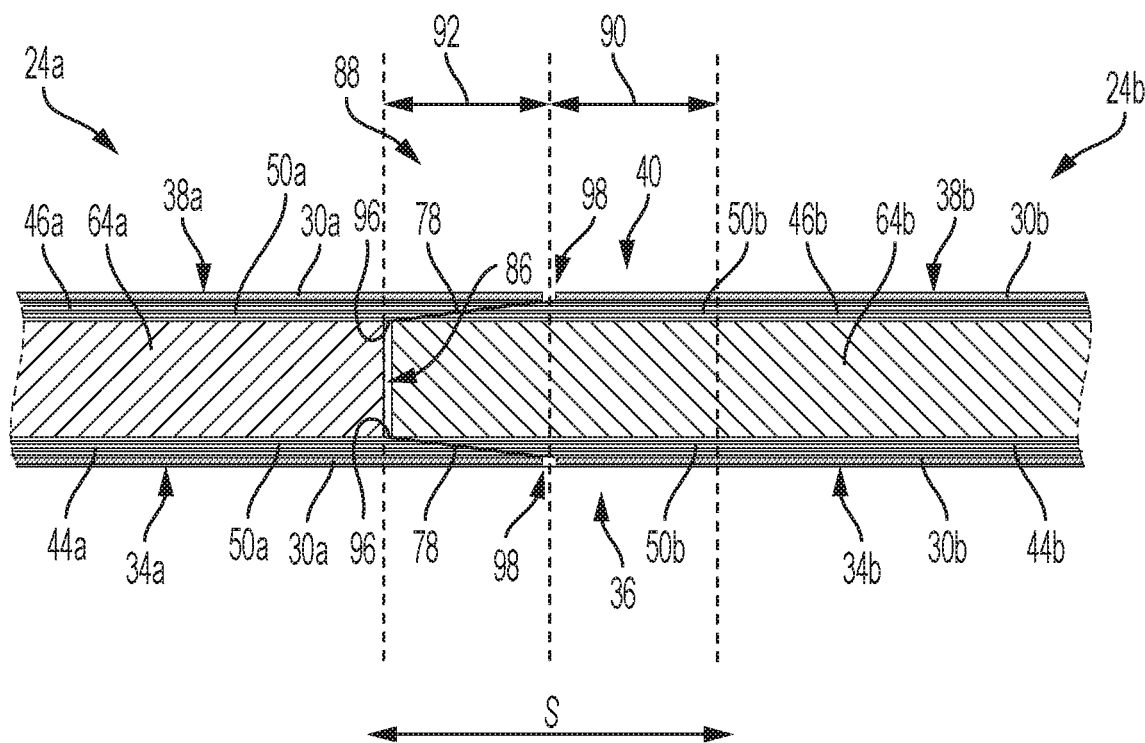

Referring now to FIGS. 6a and 6b, these figures show schematic spanwise cross-sectional views through a joint region 88 of the modular blade 12. In particular, FIG. 6a is a cross-section in a plane comprising the first shear webs 62a, 62b and FIG. 6b is a cross-section taken in a plane comprising the second shear webs 64a, 64b. FIGS. 6a and 6b are aligned so that the spanwise position of the various features may be compared.

The spar caps 44a, 44b on the windward side 36 and the spar caps 46a, 46b on the leeward side 40 of the blade 12 are shown in FIGS. 6a and 6b. It can be seen in this example that the leeward spar caps 46a, 46b are arranged in the same way as the windward spar caps 44a, 44b described previously, i.e. they are effectively a mirror image. Accordingly, and referring to FIG. 6a, the blade 12 comprises a first scarf joint 76 between leeward spar caps 46a, 46b in spanwise alignment with the first scarf joint 76 between the windward spar caps 44a, 44b. Similarly, referring to FIG. 6b, the blade 12 comprises a second scarf joint 78 between the leeward spar caps 46a, 46b in spanwise alignment with the second scarf joint 78 between the windward spar caps 44a, 44b. In other embodiments, the windward and leeward scarf joints may not be aligned, i.e. the first scarf joints 76 may be mutually offset in the spanwise direction (S) and/or the second scarf joints 78 may be mutually offset in the spanwise direction (S).

Referring to both FIGS. 6a and 6b and considering only the windward side 36 of the blade 12, it can be seen that the first scarf joint 76 is mutually offset from the second scarf joint 78 in the spanwise direction (S). This offset in the scarf joints 76, 78 between the respective beams 48a, 48b, and 50a, 50b of the spar caps 44a, 44b results from the fact that one of the beams extends beyond the other beam in each respective spar cap 44a, 44b as discussed previously and shown in FIGS. 2a and 2b. The mutually offset scarf joints 76, 78 provide an improved load path through the spar cap across the joint.

The first scarf joint 76 is located within a first spanwise region 90 of the blade 12. The second scarf joint 78 is located within a second spanwise region 92. When the blade modules 24a, 24b are connected, the first shear web 62a (FIG. 6a) of the first blade module 24a is continuous across the second spanwise region 92 comprising the second scarf joint 78. Likewise, the second shear web 64b (FIG. 6b) of the second blade module 24b is continuous across the first spanwise region 90 comprising the first scarf joint 76. It can be seen that the first shear web interface 82 (FIG. 6a) is located at an end 94 of the first scarf joint 76, whilst the second shear web interface 86 (FIG. 6b) is located at an end 96 of the second scarf joint 78. The first and second shear web interfaces 82, 86 are therefore mutually offset in the spanwise direction (S). Accordingly, at each spanwise location comprising a scarf joint in a spar cap, there is at least one continuous shear web. This arrangement of the shear webs is particularly advantageous, as it provides a continuous shear load path across the spar cap joints between the blade modules 24a, 24b.

As can be seen in FIGS. 6a and 6b, when the modules 24a, 24b are connected, the first scarf joint 76 (shown in FIG. 6a) is located within the outer shell 30b of the second blade module 24b, whilst the second scarf joint 78 (shown in FIG. 6b) is within the outer shell 30a of the first blade module 24a. The arrangement of shear webs 62a, 62b, 64a, 64b in this example means that the first shear web interface 82 (shown in FIG. 6a) is located within the outer shell 30b of the second blade module 24b, whilst the second shear web interface 86 (shown in FIG. 6a) is within the outer shell 30a of the first blade module 24a.

The above embodiment is just one example of how a modular blade 12 may be configured in accordance with the present invention. In other embodiments of the invention, the blade modules 24a, 24b may be configured in various different ways. For example, it has already been explained above that each of the scarf joints 76, 78 on the windward and leeward sides 36 and 40 of the modular blade 12 could be offset in the spanwise direction (S). It is also possible to taper the windward and/or leeward beams 48, 50 in different directions to the directions described above. In other words, there is no requirement for the leeward spar caps 46a, 46b to be a mirror image of the windward spar caps 44a, 44b. Further, it is possible to vary the lengths of the shear webs 62a, 62b, 64a, 64b to select any spanwise position for the shear web interfaces 82, 86. Moreover, it is possible to vary the location of the split line 98 in the blade shell so that the windward and leeward half shells 34a, 34b and 38a, 38b of the modules 24a, 24b terminate in different spanwise positions. By way of example of some of these possible variants, another embodiment of the invention will now be described with reference to FIGS. 7a and 7b.

Figure 7A:
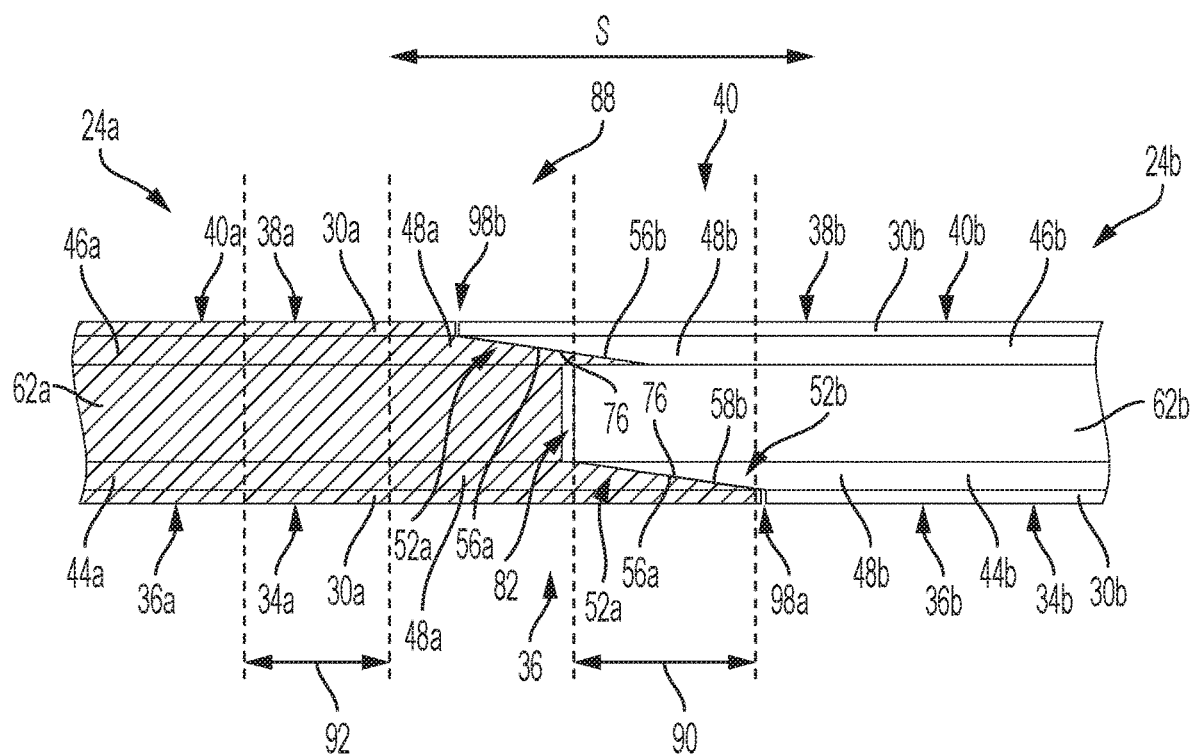
FIGS. 7a and 7b are schematic spanwise cross sectional views through a joint region of a modular blade according to another embodiment.
Figure 7B:
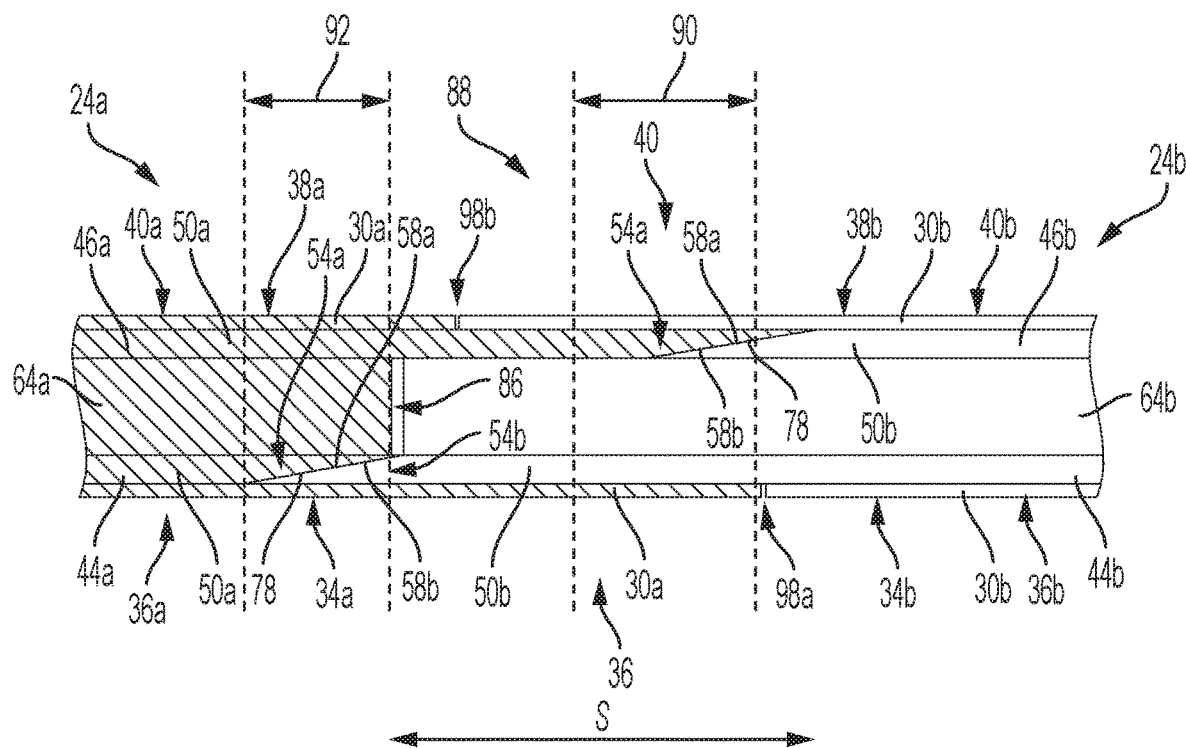

FIGS. 7a and 7b show schematic spanwise cross-sectional views through a joint region 88 of a modular blade 12 according to another embodiment. FIG. 7a is a cross-section in a plane comprising the first shear webs 62a, 62b and FIG. 7b is a cross-section taken in a plane comprising the second shear webs 64a, 64b. FIGS. 7a and 7b are aligned so that the spanwise position of the various features may be compared. The shading in FIGS. 7a and 7b is used to denote parts of the first blade module 24a. For convenience, the same reference numerals are used in FIGS. 7a and 7b to denote equivalent features to those already described in relation to the previous embodiment.

Referring to FIGS. 7a and 7b, it can be seen that the windward and leeward shells 34a, 34b and 38a, 38b of the first and second blade modules 24a, 24b terminate in different spanwise positions. Accordingly, a split line 98a between the windward shells 34a, 34b of the two modules 24a, 24b is offset in the spanwise direction (S) from a split line 98b between the leeward shells 38a, 38b.

It will be noted that the leeward spar caps 46a, 46b in this embodiment are not a mirror image of the windward spar caps 44a, 44b. In particular, referring to FIG. 7a, it can be seen that the tapered ends 52a of the respective first beams 48a on the windward and leeward sides 36a, 40a of the first blade module 24a are mutually offset in the spanwise direction (S). The windward and leeward first beams 48b of the second blade module 24b are also mutually offset in the spanwise direction (S). Referring also to FIG. 7b, the tapered ends 54a of the respective second beams 50a on the windward and leeward sides 36a, 40a of the first blade module 24a are mutually offset in the spanwise direction (S). The windward and leeward second beams 50b of the second blade module 24b are also mutually offset in the spanwise direction (S).

Referring to FIG. 7a, the scarfed surface 56a of the first beam 48a on the windward side 36a of the first blade module 24a faces an interior of the blade 12, whilst the scarfed surface 56a of the first beam 48a on the leeward side 40a of the first blade module 24a faces an exterior of the blade 12. The scarfed surface 56b of the first beam 48b on the windward side 36b of the second blade module 24b faces an exterior of the blade 12, whilst the scarfed surface 56b of the first beam 48b on the leeward side 40b of the second blade module 24b faces an interior of the blade 12. Referring to FIG. 7b, the scarfed surface 58a of the second beam 50a on the windward side 36a of the first blade module 24a faces an exterior of the blade 12, whilst the scarfed surface 58a of the second beam 50a on the leeward side 40a of the first blade module 24a faces an interior of the blade 12. The scarfed surface 58b of the second beam 50b on the windward side 36b of the second blade module 24b faces an interior of the blade 12, whilst the scarfed surface 58b of the second beam 50b on the leeward side 40b of the second blade module 24b faces an exterior of the blade 12.

In common with the previous embodiment, the first beam 48a on the windward side 36a of the first blade module 24a (shown in FIG. 7a) extends beyond the second beam 50a on the windward side 36a of the first blade module 24a (shown in FIG. 7b). The tapered ends 52a, 54a of these two beams 48a, 50a are tapered in opposite directions to one another. Correspondingly, the second beam 50b on the windward side 36b of the second blade module 24b (shown in FIG. 7b) extends beyond the first beam 48b on the windward side 36b of the second blade module 24b (shown in FIG. 7a). The tapered ends 52b, 54b of these two beams 48b, 50b are also tapered in opposite directions to one another. Accordingly, a first scarf joint 76 (FIG. 7a) is formed between the mating scarfed surfaces 56a, 56b of the respective first beams 48a, 48b on the windward side 36, and a second scarf joint 78 (FIG. 7b) is formed between the mating scarfed surfaces 58a, 58b of the respective second beams 50a, 50b on the windward side 36. The first and second scarf joints 76, 78 are mutually offset in the spanwise direction (S). Two similar scarf joints 76, 78 are also formed between the spar cap beams 48a, 48b, 50a, 50b on the leeward side 40 of the blade 12, in a similar way.

Referring to FIG. 7a, the first scarf joint 76 on the windward side 36 is located partially within the outer shell 30a of the first blade module 24a, and partially within the outer shell 30b of the second blade module 24b. More specifically, the windward shell 34a of the first blade module 24a is on one side of the first scarf joint 76, whilst the leeward shell 38b of the second blade module 24b is on the other side of the scarf joint 76. Referring to FIG. 7b, the second scarf joint 78 on the windward side 36 is located wholly within the outer shell 30a of the first blade module 24a.

As shown in FIG. 7a, a first shear web interface 82 is defined between the respective first shear webs 62a, 62b of the first and second modules 24a, 24b. The first shear web interface 82 is located partially within the outer shell 30a of the first blade module 24a, and partially within the outer shell 30b of the second blade module 24b. More specifically, the windward shell 34a of the first blade module 24a is on one side of the first shear web interface 82, whilst the leeward shell 38b of the second blade module 24b is on the other side of the first shear web interface 82. Referring to FIG. 7b, a second shear web interface 86 is defined between the respective second shear webs 64a, 64b of the first and second modules 24a, 24b. The second shear web interface 86 is located wholly within the outer shell 30a of the first blade module 24a.

The first scarf joint 76 (FIG. 7a) on the windward side 36 is located within a first spanwise region 90, whilst the second scarf joint 78 (FIG. 7b) on the windward side 36 is located within a second spanwise region 92. The first shear web 62a (FIG. 7a) of the first blade module 24a is continuous across the second spanwise region 92. The second shear web 64b (FIG. 7b) of the second blade module 24b is continuous across the first spanwise region 90. Accordingly, a continuous shear load path is ensured across the joint between the blade modules 24a, 24b.

Other aspects of the previous embodiment not explicitly described in relation to FIGS. 7a and 7b are equally applicable to this embodiment and will not be repeated for reasons of conciseness.

It will be appreciated that the designation of first and second modules 24a, 24b in the above description is arbitrary and that these designations could equally be reversed. The first or the second module 24a, 24b may be an inboard module and the other of the first and second module 24a or 24b may be an outboard module. The inboard module may comprise the blade root 20 and the outboard module may comprise a blade tip. Alternatively, the blade 12 may comprise more than two modules.

Various other modifications to the exemplary embodiment of the blade modules may be made without departing from the scope of the present invention as defined in the accompanying claims.

The invention claimed is:

1. A modular wind turbine blade comprising a first blade module having a first spar cap extending longitudinally in a spanwise direction and a second blade module having a second spar cap extending longitudinally in the spanwise direction, the blade modules being configured for connection end-to-end via their respective spar caps,
   the first spar cap comprising first and second beams arranged side-by-side, each beam of the first spar cap having a tapered end defining a scarfed surface, with the tapered end of the first beam of the first spar cap extending beyond the tapered end of the second beam of the first spar cap;
   the second spar cap comprising first and second beams arranged side-by-side, each beam of the second spar cap having a tapered end defining a scarfed surface, with the tapered end of the second beam of the second spar cap extending beyond the tapered end of the first beam of the second spar cap;
   wherein the blade modules are configured such that when the modules are connected together the scarfed surfaces of the respective first beams mate to form a first scarf joint and the scarfed surfaces of the respective second beams mate to form a second scarf joint, the first scarf joint being offset from the second scarf joint in the spanwise direction.

2. The modular wind turbine blade of claim 1, wherein the tapered ends of the first and second beams of the first spar cap are tapered in opposite directions to one another and the tapered ends of the first and second beams of the second spar cap are tapered in opposite directions to one another.

3. The modular wind turbine blade of claim 1, wherein:
   the scarfed surface of the first beam of the first spar cap and the scarfed surface of the second beam of the second spar cap each face one of an interior or an exterior of the blade; and
   the scarfed surface of the second beam of the first spar cap and the scarfed surface of the first beam of the second spar cap each face the other of the interior or the exterior of the blade.

4. The modular wind turbine blade of claim 1, wherein the first scarf joint is at least partially within an outer shell of the second blade module; and the second scarf joint is at least partially within an outer shell of the first blade module.

5. The modular wind turbine blade of claim 1 wherein:
   the first blade module comprises first and second shear webs attached respectively to the first and second beams of the first spar cap; and
   the second blade module comprises first and second shear webs attached respectively to the first and second beams of the second spar cap.

6. The modular wind turbine blade of claim 5, wherein when the blade modules are connected together:
   an end of the first shear web of the first blade module is aligned with an end of the first shear web of the second blade module at a first shear web interface; and
   an end of the second shear web of the first blade module is aligned with an end of the second shear web of the second blade module at a second shear web interface.

7. The modular wind turbine blade of claim 6, wherein the first shear web interface is offset from the second shear web interface in the spanwise direction when the blade modules are connected together.

8. The modular wind turbine blade of claim 6, wherein when the blade modules are connected together, the first scarf joint is located within a first spanwise region and the second scarf joint is located within a second spanwise region, and wherein the first shear web of the first blade module is continuous across the second spanwise region and the second shear web of the second blade module is continuous across the first spanwise region.

9. The modular wind turbine blade of claim 6, wherein the first shear web interface is located at an end of the first scarf joint and the second shear web interface is located at an end of the second scarf joint.

10. The modular wind turbine blade of claim 6, wherein the first shear web interface is at least partially within an outer shell of the second blade module and the second shear web interface is at least partially within an outer shell of the first blade module.

11. The modular wind turbine blade of claim 6, wherein the first shear webs of the respective blade modules are connected at the first shear web interface and the second shear webs of the respective blade modules are connected at the second shear web interface when the blade modules are connected together.

* * * * *